B. D. EVANS.
Combined Vapor Burner and Lamp Post.
No. 4,342. Reissued April 18, 1871.
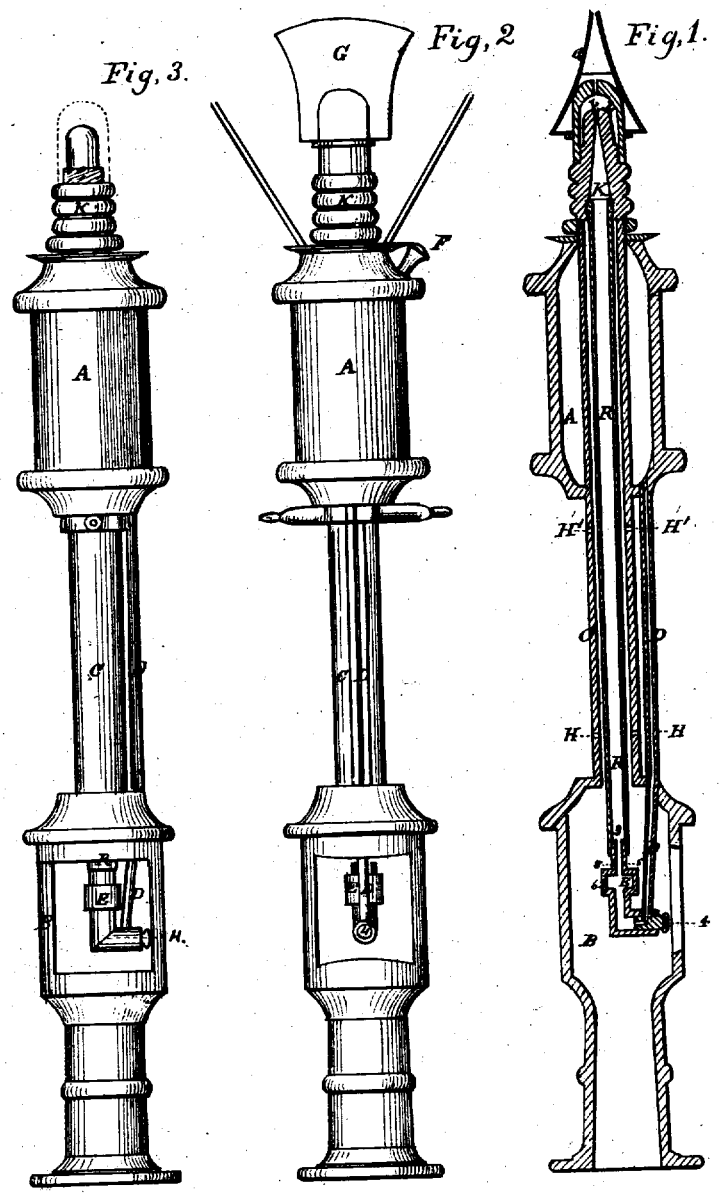
Witnesses,
W. Burris
H. Townsend
Inventor
B. D. Evans
Myers & Co
Z. C. Robbins
attys.
N. PETERS, Photo-Lithographer, Washington, D. C.

United States Patent Office.

BENJAMIN D. EVANS, OF COLUMBUS, OHIO, ASSIGNOR TO JOHN W. BAKER.

Letters Patent No. 90,830, dated June 1, 1869; reissue No. 4,342, dated April 18, 1871.

IMPROVEMENT IN COMBINED VAPOR-BURNERS AND LAMP-POSTS.

The Schedule referred to in these Letters Patent and making part of the same.

*To all whom it may concern:*

Be it known that I, BENJAMIN D. EVANS, of the city of Columbus, in the State of Ohio, have invented a Combined Gasoline Vapor-Generator, Burner, and Lamp-Post; and I do hereby declare that the following is a full and exact description thereof, reference being had to the accompanying drawing which forms a portion of this specification.

A reservoir, A, for the reception of gasoline or other suitable volatile fluid, incloses the upper portion of the tubular lamp-post C, as represented in the drawing, or may be combined therewith in any other suitable manner.

A supply-pipe, D, leads from the reservoir A to the generator E, which is located within the enlarged base B of the lamp-post.

The flow of the gasoline from the pipe D into the generator E is regulated by the stop-cock 4, which is combined with the said parts, as shown in Figure 1.

The gasoline within the generator E is volatilized by the application of heat thereto.

At first this may be accomplished by applying the flame of a lamp to the bottom of the generator until a jet of vapor shall issue through the small lateral orifice 6 in the body of the same, which jet should be at once lighted by the application of a flame thereto, and it will continue to burn so long as the proper supply of gasoline shall be supplied to the generator, and by so doing it will impart a sufficient amount of heat to the generator to cause it to throw off the desired quantity of gasoline vapor to supply the burner at the top of the lamp-post.

After the said operation has fully commenced the door which closes the opening into the chamber in the base B of the tubular lamp-post C should be shut to and properly secured.

The gasoline vapor passes from the neck of the generator E, through the narrow orifice 3, into the interior pipe R, which leads to the compound burner K M and the flame-spreader G, which are clearly represented in fig. 1, the said vapor passing outward, first, through the narrow slit in the top of the inner cap K into the heating-chamber between outer surface of said cap and the inner surface of the outer cap M, and thence outward through the narrow slit in said cap to the flame-spreader G.

The small orifices 5 5, in opposite sides of the neck of the generator E, are so proportioned as to allow a proper supply of air to pass through the same into the pipe R to furnish the ascending vapor therein the required amount of oxygen for the production of a white light at the burner.

The annular series of perforations H H′ in the sides of the tubular lamp-post C should be of such a size and location as to enable them to furnish the space within said post an ample supply of air for regulating the temperature of the pipe R, and also for admission to the ascending vapor within said pipe through the small orifices 5 5 in the neck of the generator E.

What I claim as my invention, and desire to secure by Letters Patent, is—

1. The combination of the reservoir A and the tubular lamp-post C with each other and with the generator E, substantially as and for the purpose herein set forth.

2. The combination of the vapor-pipe R and the perforated tubular lamp-post C with each other, and with the generator E and the burner K M, substantially as and for the purpose herein set forth.

3. The orifices H H′ in the sides of the tubular lamp-post C to supply the chamber within the same a sufficient quantity of air for cooling and vapor-mingling purposes, substantially as herein set forth.

4. The combination of the inner cap K and the outer cap M of the compound burner with each other and with the flame-spreader G, substantially as and for the purpose herein set forth.

5. The arrangement of the reservoir A, the supply-pipe D, the stop-cock 4, the generator E, the interior tube R, the burner K M G, and the perforated tubular lamp-post B C, substantially as and for the purpose herein set forth.

In testimony of this my application for a reissue of my Letters Patent for a vapor-burner and lamp-post, bearing date June 1, 1869, I hereunto subscribe my name the day and year first above written.

BENJAMIN D. EVANS.

Witnesses:
E. L. DE WITT,
JOHN SHORT.